July 22, 1969

R. G. KOCH 3,456,957

QUICK-CHANGE TOOL HOLDER WITH COLLAR LOCKING MEMBER

Filed Aug. 11, 1967

INVENTOR.
ROLAND G. KOCH

BY *Learman, Learman & McCulloch*

ATTORNEYS

United States Patent Office 3,456,957
Patented July 22, 1969

3,456,957
QUICK-CHANGE TOOL HOLDER WITH COLLAR LOCKING MEMBER
Roland G. Koch, Frankenmuth, Mich., assignor, by mesne assignments, to Houdaille Industries, Inc., Buffalo, N.Y., a corporation of Michigan
Filed Aug. 11, 1967, Ser. No. 659,983
Int. Cl. B23b 31/10
U.S. Cl. 279—91    7 Claims

ABSTRACT OF THE DISCLOSURE

A quick-change tool holder assembly including: an adapter for a machine tool spindle having a pair of diametrically opposite, axially directed slots in a portion which is threaded and an abutment on the periphery of the adapter inwardly of the threaded portion; a collar on the threaded portion having an internal groove therein formed to provide a radially inwardly directed flange; the flange having slots at diametrically opposite points adapted for alignment with the slots in the adapter; a tool support having a pair of radially projecting lugs adapted for passing axially into the slots so as to be received in the groove, rotation of the collar relative to the lugs misaligning the slots in the adapter and collar and moving the flange to a position to support the lugs; and a lock part on the collar movable from a position in which it engages the abutment and prevents inadvertent rotation of the collar on the threaded portion to a position in which the slots in the adapter and collar are aligned and the tool holder lugs can inadvertently fall therethrough, to a position in which rotation of the collar is possible to align the slots in the adapter and collar.

---

This invention relates to tool holders and more particularly to a quick-change holder with a lock part for preventing the nut or collar from releasing the tool inadvertently and damaging the workpiece below.

Quick-change tool holders of the character described are widely used in industry for a variety of machining operations and the workpiece held underneath the tool is valuable and, if damaged or marred, must be discarded. There is a certain amount of chatter or vibration associated with most machining operations and this tends to sometimes inadvertently back off the nut or collar to the extent that the tool adapter and tool are free to fall down to the work below.

Thus, one of the prime objects of the invention is to provide a tool holder assembly with a positively operating lock part for preventing the inadvertent release of the tool.

A further object of the invention is to provide a holder having a simple and inexpensive locking part which accomplishes the result sought without adding appreciably to the cost of the tool holder assembly.

Other objects and advantages of the invention will be pointed out specifically or will become apparent from the following description when it is considered in conjunction with the appended claims and the accompanying drawings, in which:

Figure 1:
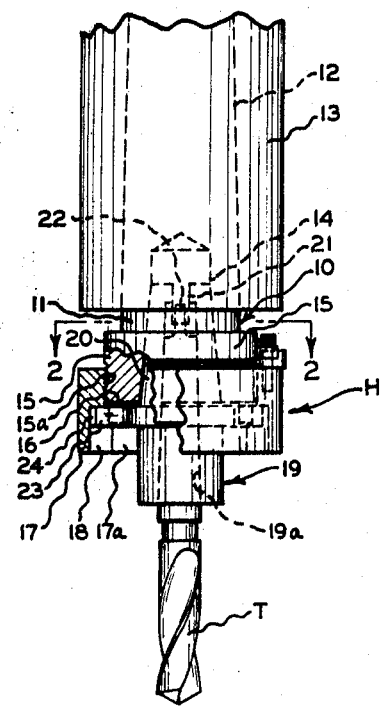
FIGURE 1 is a partly sectional side elevational view.

Referring now more particularly to the accompanying drawings in which I have shown only a preferred embodiment of the invention, a letter H generally indicates a tool holder assembly of the type disclosed in the Nickless U.S. Patent No. 2,719,722. A spindle adapter generally designated 10 has a shank portion 11 received in a bore 12 in a machine tool spindle 13 and the bore 12 and shank portion 11 preferably will be provided with a cooperating taper so that the adapter 10 is securely held in concentric position by the spindle 13.

A tapered opening 14 is also provided in the adapter 10, which has an enlarged, threaded portion 15 provided on the lower end thereof as shown, and it will be observed that, as in the patent mentioned, the portion 15 includes diametrically aligned slots 16. The threaded portion 15a of the adapter portion 15 mounts a nut or collar 17 which threads thereon and which includes a radially inwardly directing flange 17a thereon as shown, there being diametrically aligned slots 18 provides in the flange 17a as previously.

Figure 2:
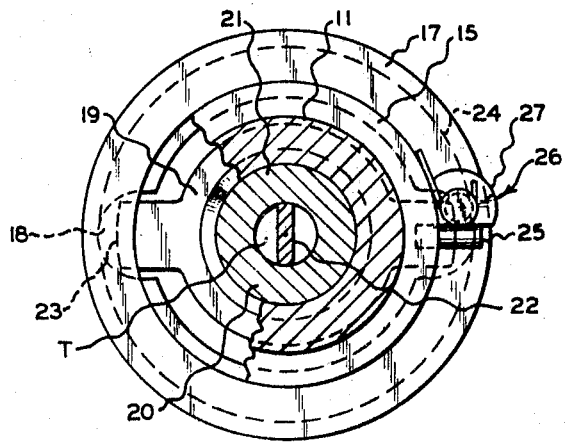
FIGURE 2 is an enlarged, transverse sectional view taken on the line 2—2 of FIGURE 1 and showing the parts of the assembly in an unlocked condition.

In the embodiment of the invention shown, the quick-change tool holder is adapted to releasably support a drill tool T but could, of course, support the workpiece instead. The tool T is securely fixed in a bore 19a provided in a supporting tool adapter shank generally designated 19 and includes an upper tapered portion 20 which is slotted at its upper end as at 21 to form a collet which is received in the cooperatingly tapered bore 14 provided in the first adapter 10. The upper end of the tool T may have a tang portion 22. Diametrically opposed lugs 23 are provided on the tool supporting adapter member 19 and, as will be clear from FIGURE 2, are of reduced size relative to the slots 18 provided in the collar or nut 15 so that they can move freely vertically when vertically aligned therewith. The lugs 23 are adapted to be received in the groove of enlarged diameter 24 between the flange 17a and upper portion of the nut 17. The mechanism thus far described is disclosed in the patent mentioned and is not being claimed except in combination with the lock part which will now be described.

Figure 3:
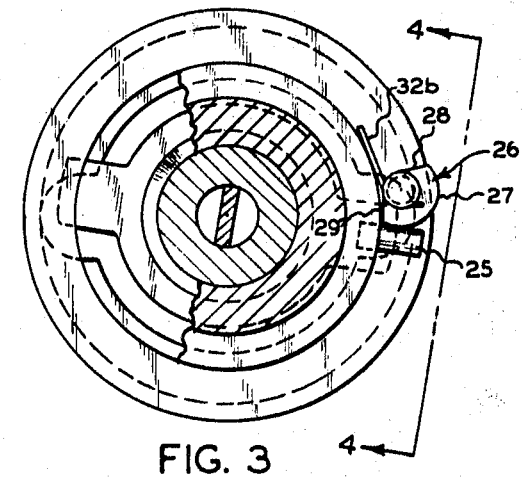
FIGURE 3 is a similar view illustrating the manner in which the lock part prevents the collar from rotating to a position in which the tool adapter can drop out.
Figure 4:
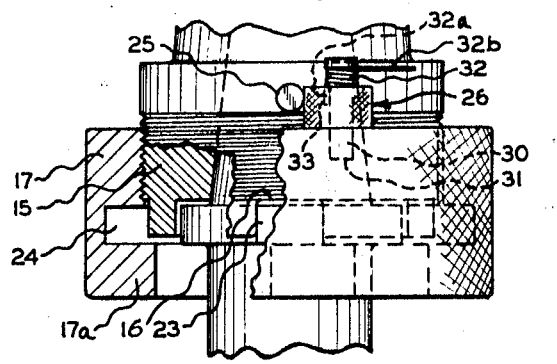
FIGURE 4 is an enlarged, partly sectional side elevational view thereof.

Extending radially from the adapter 10 in diametric alignment with one of the slots 16 and more particularly from the portion 15 thereof is an abutment pin 25 and mounted on the collar or nut member 17 to cooperate with the pin 25 in a segment-shaped lock part generally designated 26 which has a knurled, curvilinear surface 27, as shown particularly in FIGURE 4. The lock part 26 also includes relatively flat surfaces 28 and 29 and is mounted on a pin 30 received in a bore 31 provided in the upper surface of the nut member 17. The pin 30 is so angularly positioned on the nut 17 with respect to one of the slots 18 that when its curvilinear face 27 is engaging the pin 25, as shown in FIGURE 3, the slots 18 cannot be vertically aligned with the lugs 23.

A torsion spring 32 mounted on the pin 31, and having one free end 32a received in a socket 33 provided in the lock part 26, also has an end 32b extending to bear against the peripheral surface of the adapter portion 15 and will accordingly resist pivotal movement of the part 26 from the position in which it is shown in FIGURE 3 to the position in which it is shown in FIGURE 2. However, of course, the operator can pivot the lock part 26 to the position shown in FIGURE 2 with a flick of his finger and use the other hand to catch the tool supporting adapter 19 when it drops out.

In operation the tool adapter 19 and tool T are inserted when the assembly is in the FIGURE 2 position, the operator being aware that the slots 16 and 18 are vertically aligned because the nut 17 is in engagement with the lock part 26. Once the lugs 23 are moved up into groove 24, the collar 17 is moved counterclockwisely in FIGURE 2 to force the shank 20 upwardly into locked engagement in the bore 14. Thereafter the operator flicks the lock part 26 to the FIGURE 3 position. Even though the nut 17 should in the ensuing operation back off until the lock part 26 bears against the pin 25 as shown in FIGURE 2, the nut 17 is prevented from rotating further in a direction to move the flanges 23 into vertical alignment with the slots 18 in the flange 17a. However, when the operator flicks the lock part 26 to the position in which it is shown in FIGURE 2 the tool adapter 19 and tool T may be readily removed and changed.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:
1. In a quick-change tool holder: a supporting adapter adapted to be rotated by a machine tool spindle and having a bore therein; the adapter being provided with an externally threaded portion and a pair of diametrically opposite, axially directed slots terminating adjacent the externally threaded portion of said adapter; an abutment portion on the periphery of said adapter inwardly of the threaded portion; a collar threaded on said threaded portion and projecting at one end beyond the end of said adapter; said collar having an internal groove formed therein adjacent the projecting end to provide at said projecting end a radially inwardly directed flange; said flange having slots formed therein at a pair of diametrically opposite points adapted for alignment with the slots in said adapter; a holder having a portion received in said adapter bore and a pair of radially projecting lugs adapted for passing axially into said slots to be received in said groove, rotation of said collar relative to said lugs misaligning said slots in the collar and lugs on the holder and moving said flange to a position to support said lugs; and a lock part on said collar movable from a position in which it engages said abutment portion and prevents rotation of said collar on said threaded portion to a position in which the slots in said collar and lugs are aligned and said tool holder lugs can fall therethrough, to a position in which rotation of the collar is possible to align the slots and lugs.

2. The combination defined in claim 1 in which said lock part comprises an eccentric pivotally mounted on the top wall of said collar.

3. The combination defined in claim 2 in which said abutment portion comprises a radially projecting pin on said adapter.

4. The combination defined in claim 3 in which said eccentric is segment-shaped and includes a linear face and a curvilinear face with the linear face closer to the pivot axis than the curvilinear face.

5. The combination defined in claim 4 in which spring means resists movement of said eccentric from a position in which said curvilinear face is in engagement with said pin and the slots in the collar and the lugs are out of alignment to a position in which said linear face is permitted to engage said pin.

6. The combination defined in claim 5 in which said spring means comprises a torsion spring on a pivot pin which mounts said eccentric, the spring having a projecting part extending perimetrally in engagement with said collar.

7. In a quick-change tool holder: a supporting adapter adapted to be rotated by a machine tool spindle; the adapter being provided with a holder receiving bore and an externally threaded portion; a collar threaded on said threaded portion; a holder having a portion received in said adapter bore; generally radial slot and lug means on said collar and holder enabling said holder to be moved axially up into and out of said collar when the slot and lug means are in axial alignment; means on said collar for supporting said holder upon rotation of said collar relative to said holder to misalign said slot and lug means; and an abutment and lock part on said collar and adapter relatively movable from a position in which said lock part engages said abutment and prevents rotation of said collar on said threaded portion to a position in which the slot and lug means is aligned and said holder can be removed to a position in which rotation is possible to align the slot and lug means on the holder and collar.

References Cited

UNITED STATES PATENTS

| | | | |
|---|---|---|---|
| 1,034,723 | 8/1912 | Mueller et al. | 279—91 |
| 3,380,746 | 4/1968 | Benjamin et al. | 279—91 |

ROBERT C. RIORDON, Primary Examiner